United States Patent
Pinhasov

(10) Patent No.: US 8,059,275 B1
(45) Date of Patent: Nov. 15, 2011

(54) AUTO POLARIZED LIGHT REMOVAL

(75) Inventor: Eran David Pinhasov, Zichron Yaakov (IL)

(73) Assignee: Zoran Corporation, Sunnyvale, CA (US)

( * ) Notice: Subject to any disclaimer, the term of this patent is extended or adjusted under 35 U.S.C. 154(b) by 298 days.

(21) Appl. No.: 12/352,520

(22) Filed: Jan. 12, 2009

Related U.S. Application Data

(60) Provisional application No. 61/079,078, filed on Jul. 8, 2008, provisional application No. 61/022,129, filed on Jan. 18, 2008.

(51) Int. Cl.
*G01J 4/00* (2006.01)
(52) U.S. Cl. .......................... 356/364; 356/368
(58) Field of Classification Search .................. 356/364, 356/368, 370
See application file for complete search history.

(56) References Cited

U.S. PATENT DOCUMENTS

| | | | |
|---|---|---|---|
| 6,028,303 A * | 2/2000 | Suzuki | 250/225 |
| 6,492,635 B2 * | 12/2002 | Simchoni | 250/225 |
| 7,173,696 B2 * | 2/2007 | Taverner et al. | 356/327 |
| 7,872,666 B2 * | 1/2011 | Van Schaik et al. | 348/57 |
| 2002/0030755 A1 * | 3/2002 | Uchino | 348/342 |
| 2008/0246948 A1 | 10/2008 | Van Schaik et al. | |

* cited by examiner

*Primary Examiner* — Layla Lauchman
(74) *Attorney, Agent, or Firm* — Frommer Lawrence & Haug LLP; John W. Branch

(57) ABSTRACT

A system and method for automatically removing polarized light in an environment having polarized light and unpolarized light. Light is processed by a polarizer and measured by a sensor. Multiple measurements of a light characteristic are taken, each measurement corresponding to a polarity setting of the polarizer. The polarizer is automatically adjusted to enable the multiple measurements. The measurements may be of average light intensity, contrast, saturation, or another characteristic. Based on the multiple measurements and the corresponding polarity settings, an optimal polarity setting is determined, such that the amount of polarized light is minimized. A curve fitting calculation may be used to make the determination. The polarizer is adjusted to the determined polarity setting.

20 Claims, 6 Drawing Sheets

AUTO POLARIZED LIGHT REMOVAL

CROSS-REFERENCE TO RELATED APPLICATIONS

This utility patent application is based upon U.S. Provisional Patent Application No. 61/022,129, filed on Jan. 18, 2008, and U.S. Provisional Patent Application No. 61/079,078, filed on Jul. 8, 2008. The benefits of each of these provisional applications are hereby claimed under 35 U.S.C. §119(e) and each is incorporated herein by reference in their entirety.

FIELD OF THE INVENTION

The present invention relates generally to photographic systems, and more particularly, to mechanisms for reducing polarized light received by a photographic system.

BACKGROUND

In photography, most of the light that is received by a camera is reflected off of various objects. For example, white light from the sun may be reflected off of different objects in the field of view. An object appears to have a specific color because the object reflects light of the specific color, and absorbs light of other colors. For example, a blue object reflects blue light and absorbs light of frequencies other than blue. Often, a small amount of the latter is reflected off of the object without being absorbed, retaining the colors of the original light, such as the white light from the sun. When this extraneous light has a sufficiently high intensity, it is seen as "glare," and has the effect of washing out the color saturation of the object.

Often, the reflected glare is polarized light, while the desirable reflected light is not polarized. This is due to the nature of the material and the reflection angle. Light is made up of light waves that are generally perpendicular to the light's direction of travel. In non-polarized light, the light waves are in many different planes, each plane being perpendicular to the direction of travel. In polarized light, the light waves are limited to one plane. Thus, while the desirable light received by a camera is non-polarized and in many planes, the undesirable glare is mostly polarized and in a single plane.

Some photographic systems enable use of a polarizer filter on a camera lens that allows a photographer to manually filter out much of the undesirable polarized light by rotating the polarizer filter until it is positioned so that it blocks the polarized light, thereby removing much of the glare, such as unwanted reflections from water, glass, vegetation, foliage, roads, and other non-metallic surfaces. Unwanted polarized light reflected by the atmosphere may also be filtered, allowing improved saturation of a blue sky. Manual positioning of a polarizer filter may take extra time or add complexity to the photographic process. A photographer's judgment as to the best position may have an unacceptable level of inaccuracy. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
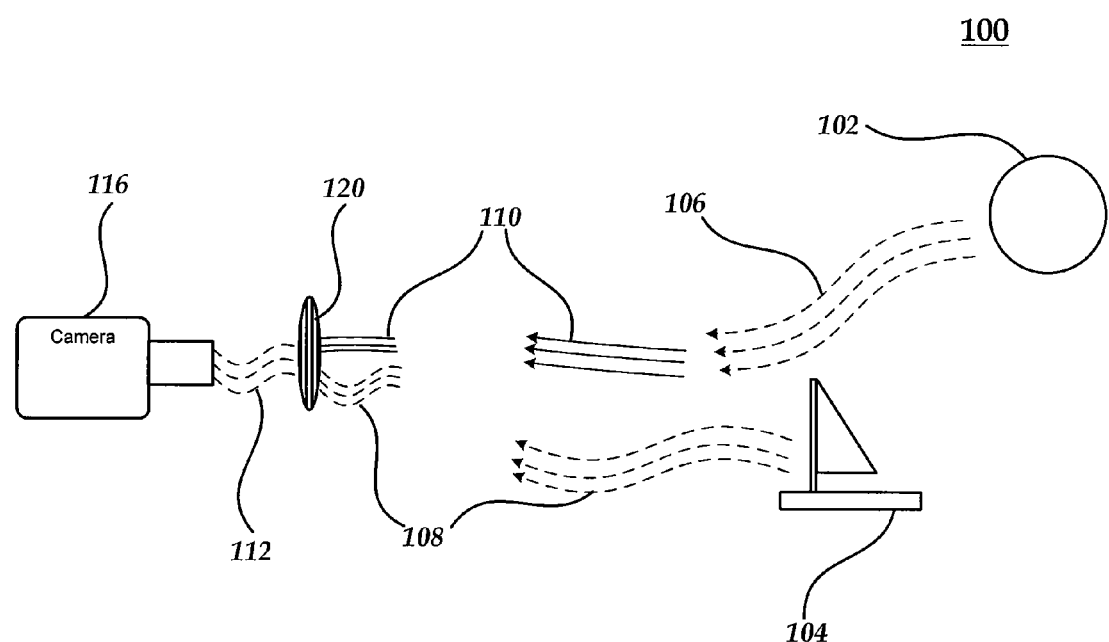
FIG. 1 is a pictorial representation of an environment in which polarized and non-polarized light may be observed.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the invention is directed toward facilitating the blocking of polarized light. A system, method, and components operate to filter out polarized light in an environment that may include both polarized and unpolarized light. A system may include a polarizer, a mechanism for adjusting polarity of the polarizer, a sensor and an associated mechanism for measuring one or more characteristics of light, a mechanism for determining an optimal polarizer polarity setting, and a mechanism for adjusting the polarizer accordingly. More specifically, a system may include a light measurement component that determines a light measurement based on a characteristic of light that is received by a sensor after the light passes through or is otherwise processed by a polarizer. It may also include a logic unit that determines multiple values of the light characteristic, each value corresponding to a polarity setting. The system may adjust the polarizer polarity to different settings in order to obtain the multiple values, and automatically adjust the polarizer polarity to a determined optimal polarity setting, which minimized the amount of polarized light reaching the photographic system sensor.

In one aspect of the system, the logic unit may employ a curve fitting calculation based on the obtained light characteristics, to determine a polarity setting that results in a minimum amount of polarized light reaching the photographic system sensor. In one embodiment, the values are fit to a trigonometric function, and specifically a function that includes the square of a cosine of the angle between the polarized light plane and the polarizing filter polarity.

In one aspect of the system, the characteristic being measured is one or more of light intensity, contrast, or saturation. The light intensity may be an average intensity received by the sensor.

In one aspect of the system, a process for determining an optimal setting may be triggered by a manual switch or other mechanism by a user. In one aspect, the process may be automatically triggered during a sequence of image captures, such as while capturing video.

In one aspect of the system, multiple light measurements are timed to enable obtaining measurements at a common phase of a light source, such as a fluorescent light. This may be performed by synchronizing measurements to the light strobe frequency or by a mechanism that detects the light strobe and enables automatic synchronization.

FIG. 1 is a pictorial representation of an environment 100 in which polarized and non-polarized light may be observed. As seen in FIG. 1, a light source 102 provides light of a variety of frequencies, typically seen as white light. Though light source 102 is illustrated as a natural light source, specifically the sun, in some environments the light source may provide an artificial light, such as light from a light bulb. Any light source or combination of light sources may exist in environment 100. Though not illustrated in FIG. 1, ambient light, such as reflection from the atmosphere, may provide light to the environment from a multitude of directions. Typically, the one or more light sources 102 provide a much higher intensity of light than the ambient light.

FIG. 1 illustrates one or more target objects 104 that are visible because of light reflected from the light source 102 or ambient light. Target objects may include background objects or surfaces that fall within a frame of view. For ease of discussion, the collection of target objects is referred to herein as a singular target object, or simply the target. The target may be of one or more colors, each color reflecting light corresponding to the color and absorbing light of other colors.

As seen in FIG. 1, non-polarized light 106 is emitted from light source 102 or ambient light sources and a subset of this light is reflected from target 104. Non-polarized light 108 represents reflected light that remains non-polarized after reflection. This light reaches an optical receiver, such as camera 116. Camera 116 may take still photographs, video, or a combination thereof. Camera 116 may record photographs, transmit signals that include photographic images, display received images, or process images in another manner. An optical receiver may perform functions other than photography, such as sensing and analyzing received light. Non-polarized light 108 is typically the desirable light that enables photography, analysis, processing, or other functions related to the optical receiver. Polarized light 110 represents reflected light that has become polarized as a result of reflection from an object. Some objects, such as water and glass, tend to produce polarized light more readily than others. The surface that reflects polarized light may be the target 104 or an object in a line of sight with the camera. In some situations, polarized light 110 has a high intensity in comparison with non-polarized light 108, and may obstruct the reception or vision of the non-polarized light. The intense polarized light may result in glare in the view of the target 104, washing out the color saturation of target 104 and causing recording or other processing to be unsatisfactory.

FIG. 1 illustrates non-polarized reflected light 108 in a direction of travel from right to left. The waves of non-polarized light 108 occupy multiple planes, each plane perpendicular to the direction of travel. FIG. 1 also illustrates polarized reflected light 110 in a direction of travel from right to left. The illustrated waves of polarized light 110 are in a plane that includes the direction of travel and the line of sight of FIG. 1. Thus, the waves appear as straight lines in FIG. 1. A line in the plane that includes the polarized light waves and is perpendicular to the direction of travel is referred to as the alignment of the polarized light. As illustrated in FIG. 1, the alignment of the illustrated polarized light 110 is approximately horizontal and perpendicular to the page. Thought FIG. 1 presents a simplified view of polarized light, it is to be noted that some reflective surfaces may produce polarized light with differing alignments. For example, waves in a body of water may cause reflection at different angles and may cause polarized light to have close, but different alignments.

As illustrated in FIG. 1, a polarizer 120, also referred to as a polarizer filter, receives both non-polarized light 108 and polarized light 110. Polarizer 120 has a specific polarity, corresponding to a rotational alignment, such that light waves having a different alignment may be blocked from passing through the polarizer. The polarizer polarity is represented by lines in the direction of the polarity. Thus, the polarizer polarity of polarizer 120 is vertical. The polarity of polarizer 120 may be modified to various directions. In one embodiment, a polarity in a first direction is considered to be a polarity of zero degrees, and the polarity may be measured by the angle between the polarity and the direction of zero degree polarity. Thus, the polarity may have a corresponding value between zero and 180°. It is to be noted that a polarity greater than 180° is equivalent to a corresponding polarity less than 180°, such that it is sufficient to refer to polarities greater than or equal to zero degrees and less than 180°. In some embodiments, the polarizer polarity may have a granularity, such that it may be adjusted in increments. An increment may be measured in a number of degrees, such as one degree. In some embodiments, the polarity increment may vary as the polarity changes.

Figure 2:
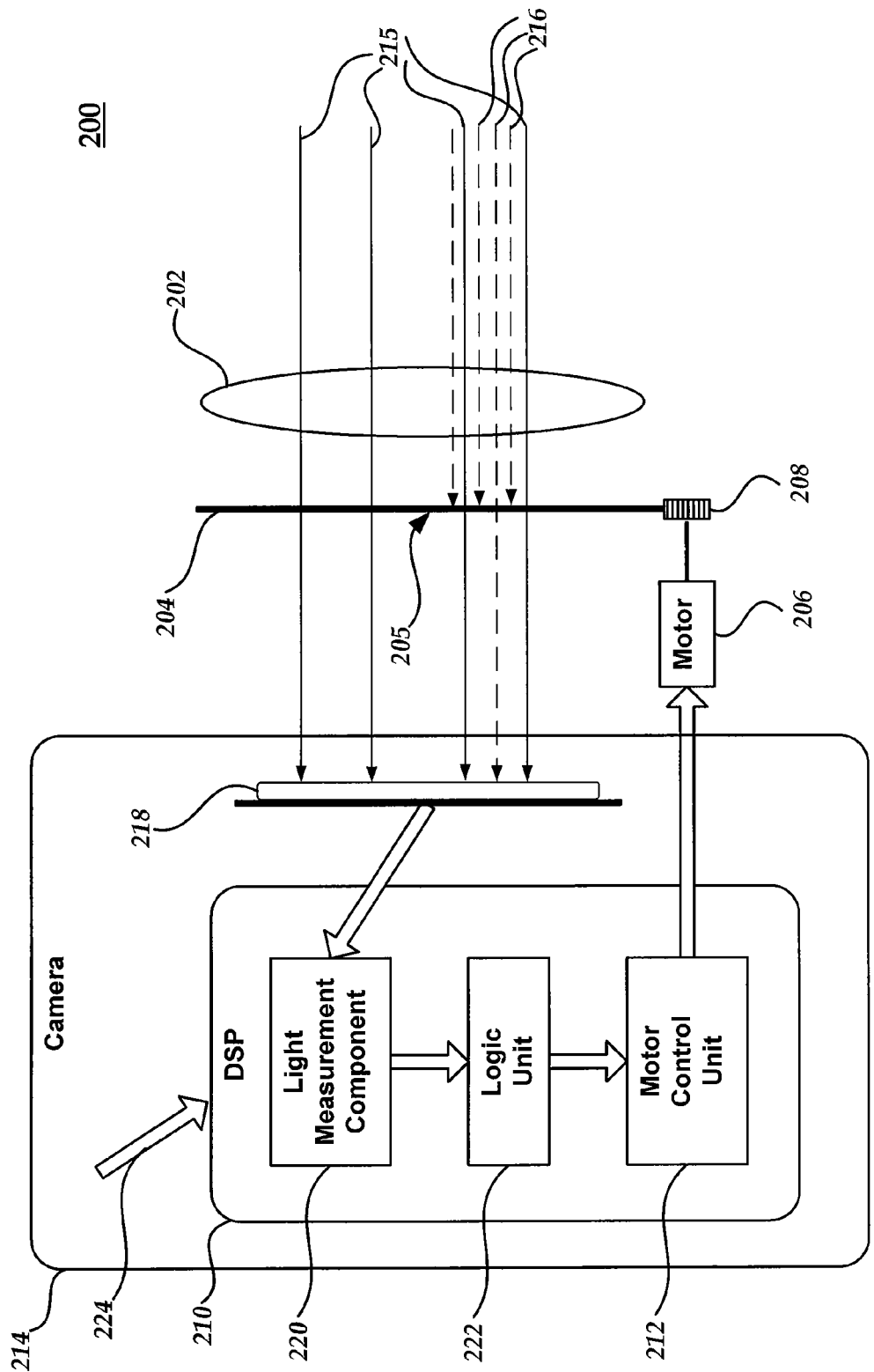
FIG. 2 is a block diagram of a photographic system in accordance with an embodiment of the invention.

FIG. 2 illustrates a photographic system 200 in accordance with an embodiment of the invention. Photographic system 200 may, for example, be camera 116 of FIG. 1, or a portion thereof. Photographic system 200 may include one or more components that are external to camera 116. As illustrated, a photographic system 200 includes a lens 202 that receives external light. In one embodiment, lens 202 may be a camera's primary lens. In one embodiment, lens 202 may be an external lens that is attached or otherwise integrated with a camera. In some configurations, photographic system 200 may include multiple lenses, though only one is illustrated. In the illustrated photographic system 200, lens 202, polarizer 204, gear 208, and motor 206 are external to camera 214, though in various embodiments, some or all of these components may be internal to or integrated with camera 214.

Photographic system 200 further includes polarizer 204. Polarizer 204 may be the polarizer 120 of FIG. 1, or a polarizer having similar attributes. Polarizer 204 has a corresponding polarizer polarity, which may be configured. As discussed herein, polarizer polarity affects the amount of polarized light that is blocked by polarizer 204. FIG. 2 illustrates a transmissive polarizer, that allows light to pass though it and blocks some portion of polarized light. In one embodiment, polarizer 204 may be a reflective polarizer that reflects desirable light and absorbs polarized light or allows polarized light to pass through.

In one embodiment, polarizer 204 may be rotated around a corresponding polarizer point of rotation 205. Though polarizer point of rotation 205 is illustrated at approximately the center of polarizer 204, in some configurations, the point of rotation may be offset at a position other than the center. It is to be noted that polarizer point of rotation 205 is a virtual point, and not a physical component.

In the illustrated embodiment of photographic system 200, polarizer 204 may be configured by polarizer motor 206 acting upon gear 208. Gear 208, under the control of polarizer motor 206 may rotate in a manner to contact polarizer 204 and cause a corresponding rotation of polarizer 204. Though only a single gear 208 is illustrated, it is understood that multiple gears, pinions, rods, or other mechanical components may be combined to control movement or rotation of polarizer 204 around polarizer point of rotation 205, and that the various mechanical components may be configured in a variety of ways. In one embodiment, polarizer motor 206 controls rotation of polarizer 204 in small increments, such as increments of one degree of rotation or less.

Polarizer motor 206 may, in turn, be controlled by signals from motor control unit 212. Motor control unit 212 may include software, hardware, or a combination thereof. Motor control unit 212 may employ a hardware motor control interface (not shown) to signal or otherwise control polarizer motor 206. The actions of motor control unit 212 are discussed in further detail herein.

In one embodiment, motor control unit 212, or a portion thereof, may be contained within a digital signal processor (DSP) 210. The COACH family of digital camera processors, by Zoran Corporation, of Sunnyvale, Calif., includes DSP technologies that may be employed to implement the present invention. DSP 210 may represent a COACH processor, another processor, or a portion thereof.

Though not illustrated in FIG. 2, in one embodiment, an electronic polarizer may be employed in a photographic system. An electronic polarizer may have a polarizer controller in place of motor control unit 212 and polarizer motor 206. For example, an LCD polarizer may be controlled by a polarizer controller sending electronic signals to an LCD component to adjust the polarization.

Photographic system 200 further includes one or more sensors, such as image sensor 218, that receive light after it has been processed by polarizer 204. In one embodiment, image sensor 218 is made up of an array of photo sensors, each photo sensor receiving a portion of the light received by the entire image sensor. Image sensor 218 may produce electrical signals based on the received light. It may be used for determining an intensity of light received by each sensor.

A light measurement component 220 receives one or more signals from image sensor 218. The light measurement component 220 may determine one or more characteristics of the image received by image sensor 218. In one embodiment, the characteristic is a measurement of light intensity. This may be an average intensity of the entire image or a portion thereof, or another measurement of intensity corresponding to the image. In one embodiment, the characteristic is a measurement of contrast corresponding to the image. In one embodiment, the characteristic may be a measurement of saturation corresponding to the image. Combinations of one or more of the characteristics described herein, or other characteristics, may be employed in accordance with the mechanisms described herein. Light measurement component 220 may include software, hardware, or a combination thereof, and the determining logic may be implemented by software, hardware, or a combination thereof. In the illustrated embodiment, light measurement component 220, or a portion thereof, may be contained in DSP 210, though in other embodiments it may be external to DSP 210.

DSP 210 may further include logic unit 222 that includes logic for performing mechanisms of the invention described herein. Logic unit 222 may include hardware, software, or a combination thereof. Logic unit 222 may receive data from light measurement component 220, process the data in accordance with programmed logic, and send instructions to motor control unit 212. This process is discussed in further detail herein.

Photographic system 200 may operate in the following manner, or a variation thereof. Light may be received by lens 202 in the form of polarized light 216 and non-polarized light 215. This may correspond to polarized light 110 and non-polarized light 108 of FIG. 1, respectively. The light may pass through lens 202 and be received by polarizer 204. As discussed herein, polarizer 204 may block an amount of polarized light 216, the amount at least partly based on a polarity of polarizer 204, and an alignment of polarized light 216. Polarizer 204 may also block a portion of non-polarized light.

Upon passing through polarizer 204, a portion of non-polarized light 215 and polarized light 216 may be received by image sensor 218. Light measurement component 220 may received raw data from image sensor 218, and process it to determine a light characteristic measurement, such as average light intensity, saturation, or contrast.

Logic unit 222 may receive multiple measurements from light measurement component 220 and follow program logic to determine an optimal polarity setting for polarizer 204. It may, intermediary through motor control unit 212, adjust the polarity setting of polarizer 204 to the determined optimal polarity setting. Other components (not shown) of camera 214 may record or otherwise process the modified light image. The processes and associated logic are described in further detail herein.

Figure 3A:
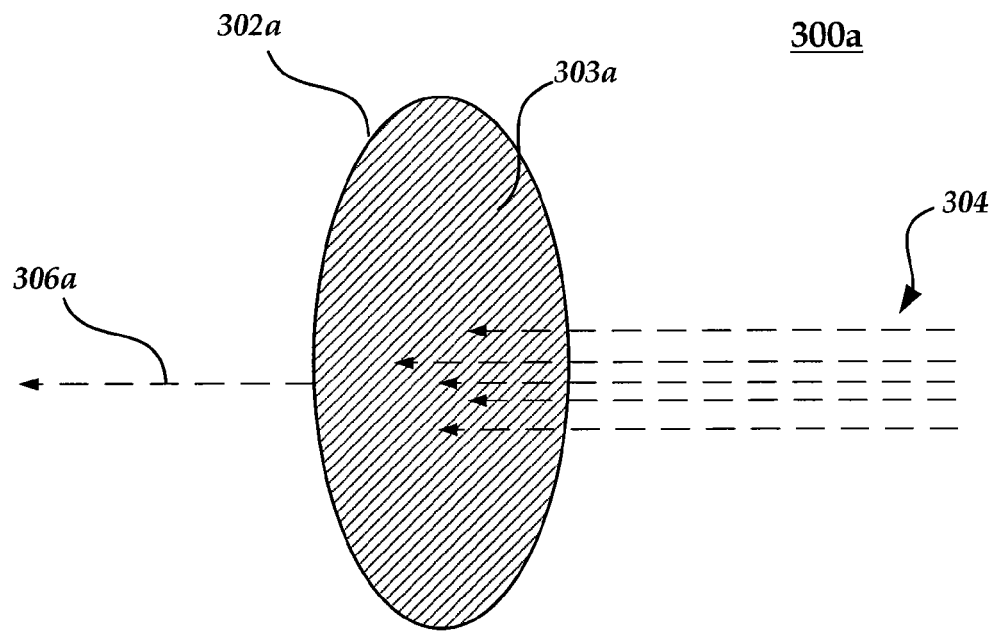
FIGS. 3A-B are pictorial representations of an environment in which a polarizer is employed.
Figure 3B:
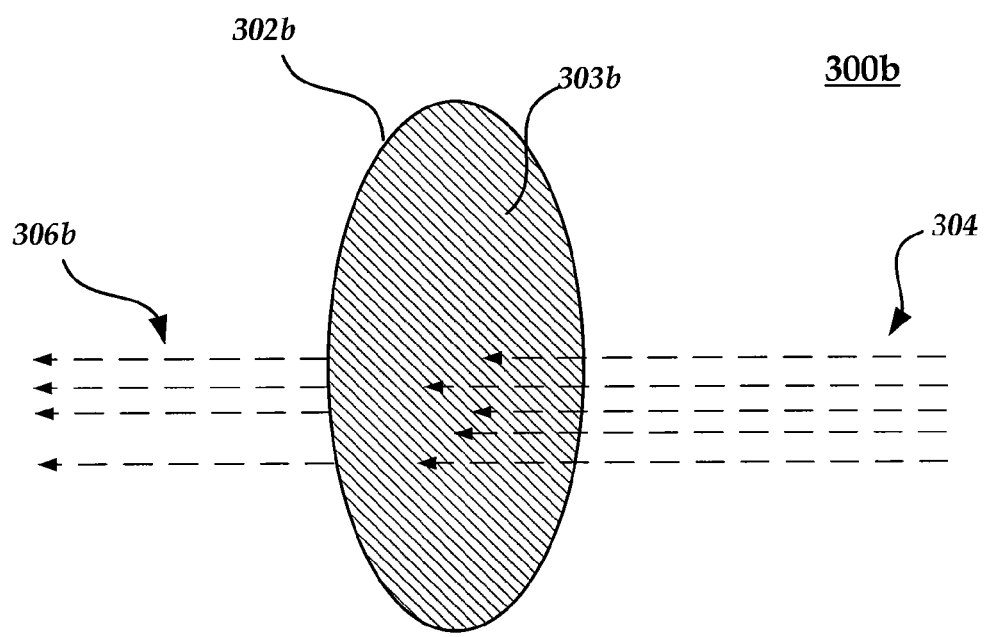

FIGS. 3A-B are pictorial representations of an environment 300a-b in which a polarizer 302a-b filters polarized light. Elements of FIG. 3A may be the same elements or may be combined with elements of photographic system 200 of FIG. 2. In environment 300a of FIG. 3A, polarizer 302a is configured to have a first polarity as represented by parallel lines 303a. Polarized light 304 travels from right to left toward polarizer 302a. Only a small portion of the polarized light 304 passes through polarizer 302a. This small portion is represented by dashed arrow 306a. The remainder of polarized light 304 is absorbed or reflected by polarizer 302a.

In environment 300b of FIG. 3B, polarizer 302b is configured to have a different polarity as represented by parallel lines 303b. Polarizer 302b may be the same polarizer as polarizer 302a of FIG. 3A, though the angle of the polarizers differs. Polarized light 304 travels from right to left toward polarizer 302b. Almost all of the polarized light 304 passes through polarizer 302b. This portion is represented by dashed arrows 306b. Only a small portion of polarized light 304 is absorbed or reflected by polarizer 302b.

As illustrated in the examples of FIGS. 3A-B, the polarity configuration of polarizer 302a is more effective than the polarity configuration of polarizer 302b in blocking the polarized light 304. The polarity configuration of polarizer 302a may or may not be the optimal configuration for the example environment, but it is clearly closer to the optimal configuration than polarizer 302b. Thus, FIGS. 3A-B illustrate an advantage of determining an optimal polarity configuration to improve an image by blocking at least a significant portion of polarized light.

Figure 4A:
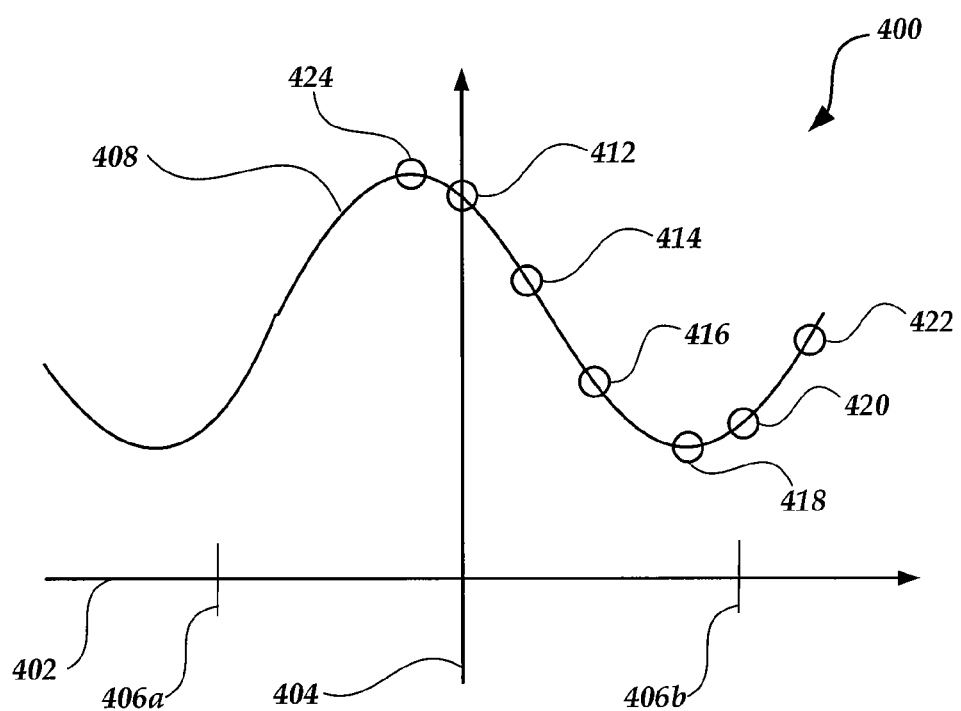
FIGS. 4A-B are graphs representing light intensity as a function of a polarizer polarity in example environments in which the invention may be employed.

FIG. 4A illustrates a graph 400 that represents an example of light intensity detected by an image sensor as a function of a polarity of a polarizer, while performing the techniques described herein with a system such as illustrated in FIG. 2. The image sensor may be image sensor 218, and the polarizer may be polarizer 204 of FIG. 2. Though such a graph may vary based on a system configuration, an implementation employed, the environment in which the system is employed, or other factors, graph 400 is provided as an example to illustrate the mechanisms described herein.

In FIG. 4A, horizontal axis 402 represents angles of polarity. Degrees are used as the units in this discussion, though other units may be used. The y-axis 404 is located such that the y intercept indicates a polarity of zero degrees. A polarity of zero degrees may represent a starting position of the polarizer at the time that the methods discussed herein begin, or it may represent a configured polarity, or any particular polarity in various implementations. Lines 406a and 406b represent polarities of −90° and +90°, respectively. The vertical axis represents an amount of light intensity received by the image sensor, such that the curve 408 represents the amount of light intensity as a function of the polarizer polarity, assuming there is no significant change in the captured scene or its lighting. The amount of light intensity may be an average light intensity, or another metric representing the intensity of light received by the sensor. In some environments, the light intensity indicates the intensity of both polarized and unpolarized light that is received. In the example curve 408, the point 418 is a minimum point, and indicates an optimal polarity setting that provides a minimum amount of light intensity on the curve 408. Thus, the mechanisms herein described act to determine the minimum point 418 or a point sufficiently close to minimum point 418 to provide the advantages herein described.

In one implementation of the invention in one environment, the system may determine an amount of light intensity at a zero polarity, represented by point 412. The polarity of the polarizer may then be adjusted to a second setting, and the corresponding light intensity determined, as represented by point 414. In the example graph, point 414 has a lower light intensity. Thus, the polarity may be adjusted in the positive direction, determining the point 416. The next determined point may be point 420. Though this point is past the minimum point 418, the light intensity value is lower than the previous point 416, and the process may continue to determine a next point 422. Since point 422 has a higher light intensity value than point 420. The process does not need to continue with polarities greater than the polarity of point 422.

In one implementation, it may be known at this point that an optimal polarity is on curve 408 between points 416 and 422, and that point 420 is the closest known point to the minimum point 418. In one implementation, in which the granularity of the polarity increments is sufficiently small, the point 420 may be used as a final point, and the corresponding polarity setting may be used. In one implementation, interpolation techniques may be employed to gather additional light intensity values, until a point is reached that is sufficiently close to an optimal point.

It should be noted that in some environments, the second point determined may have a higher light intensity than the first point. In this situation, polarity may be adjusted in the same direction until a decrease is found, continuing as discussed above. Alternatively, the polarity may be adjusted in the opposite direction, continuing as discussed above in a different direction. Various other techniques for determining a polarity that is sufficiently close to an optimal position may be employed. In one implementation, it may be noted that the rate of change of light intensity may be a minimum at or near the optimal minimum point 418. Thus, the increments of polarity may be adjusted to be smaller when it is determined that the differential of light intensity between points is decreasing. In one implementation, light intensity may be determined at polarity increments of a sufficiently small granularity so that when the changes in intensity change from decreasing to increasing, it is known that a minimum point has been found. In one embodiment, the system may determine light intensity at every possible polarity setting within a 180° range, and then select the polarity having the lowest intensity. In one embodiment, the system may determine light intensity at every possible polarity setting within a 90° range or a range greater than 90°. If the range includes a local minimum point, the corresponding polarity setting may be used as the optimal polarity setting. If the range includes a local maximum point, the angle 90° from the polarity setting corresponding to the maximum point may be used as the optimal polarity setting.

As noted above, a graph of light intensity as a function of polarizer polarity may vary due to one or more of several factors. In some variations, a graph may have a similar shape to graph 400, yet be shifted to the right or left, have slopes of greater or less magnitude, or other variations. In some environments, more than one source of polarized light may exist such that the differing sources have different polarities from each other. In such a situation, a resultant graph may be a combination of two or more graphs. An optimal polarity with respect to one source of polarized light may differ from an optimal polarity with respect to a second source, and an overall optimal polarity may be found by using the combined light intensity. In one implementation, a single minimum point is not assumed, and the techniques described herein may include extending the sampling to determine a lowest minimum point.

In various implementations, one or more of several measurements of light intensity or variations thereof may be employed, and the mechanisms for determining the measurements may vary. In one implementation, an average intensity of the entire image received by the image sensor (e.g. image sensor 218 of FIG. 2) may be used. In one implementation, a partial averaging of sub-image light intensities may be used. The light measurement may be determined by using data available from a primary sensor that receives an image during a camera's preview mode. In one implementation, an auto-exposure dedicated sensor may be used to receive an image and provide data for calculating light intensity. In one implementation, a component, such as the light measurement component 220 of FIG. 2, may employ a hardware accelerator to obtain a course luminance image and perform calculations in software. Thus, the light measurement component 220 may include software, hardware, or a combination thereof.

In one implementation, a measurement of image contrast is employed in place of light intensity. In such an implementation, a graph of contrast as a function of polarity may appear approximately negated from the graph of FIG. 4A. That is, a desired point on the graph will be one having a polarity that provides approximately a maximum contrast. Similarly, in one implementation a measurement of saturation may be employed, with a similar technique that determines a polarity having approximately a maximum saturation. In one implementation, two or more different image characteristics may be used to determine an optimal polarity based on multiple characteristics.

In one embodiment, the number of polarity settings and corresponding intensity measurements may be reduced by employing knowledge of intensity as a function of the electric field strength angle between the polarizer polarity and the plane of polarized light. Specifically, the intensity I may be represented as:

$$I = \tfrac{1}{2} c \epsilon E^2,$$

where c is the speed of light, $\epsilon$ is the permittivity of free space, and E is the electric field strength. Further, the electric field strength of a light beam may be represented as:

$$E = E_0 \cos(\theta),$$

where E is the electric field strength of the light after passing through the polarizer, $E_0$ is the electric field strength prior to passing through the polarizer, and $\theta$ is the angle between the polarizer polarity axis and the light initial plane of polarization. Combining these two equations gives us:

$$I = \tfrac{1}{2} c \epsilon (E_0 \cos(\theta))^2 = I_0 \cos^2(\theta)$$

This equation is known as Malus's Law. Thus, the light intensity as detected by a sensor, such as sensor 218 (FIG. 2), is proportional to the square of the cosine of the angle between the polarizer polarity axis and the light plane of polarization. Thus, the amount of polarized light that is blocked is an increasing function of the angle between the polarized light plane of polarization and the polarizer polarity axis, up to 90°, so that the amount of polarized light that is blocked is at a maximum, and correspondingly the determined light intensity is at a minimum, when the polarizer polarity axis is perpendicular to the polarized light plane of polarization. An optimal polarity setting may therefore be at the perpendicular alignment.

In one embodiment, a process for determining an optimal polarity setting includes taking three measurements of light intensity corresponding to three different polarity settings. The above equation may be solved, using the three measurements, to determine a minimal value of intensity and a corresponding polarity setting. The polarizer may then be adjusted to the determined polarity setting. This technique is referred to herein as a "fast search." Using measurements that are distributed within a domain of 180° provides advantages with respect to accuracy. In one embodiment, three measurements are used such that a second polarity differs by approximately 55° from a first polarity setting, and a third polarity setting differs by approximately 55° from the second setting (110° from the first setting), though the measurements may be taken in any order.

In one embodiment, a fast search may be performed, followed by additional measurements in a local range near the determined polarity setting. The additional measurements may allow for fine tuning of the polarity setting to a higher level of accuracy than that provided by the fast search.

Figure 4B:
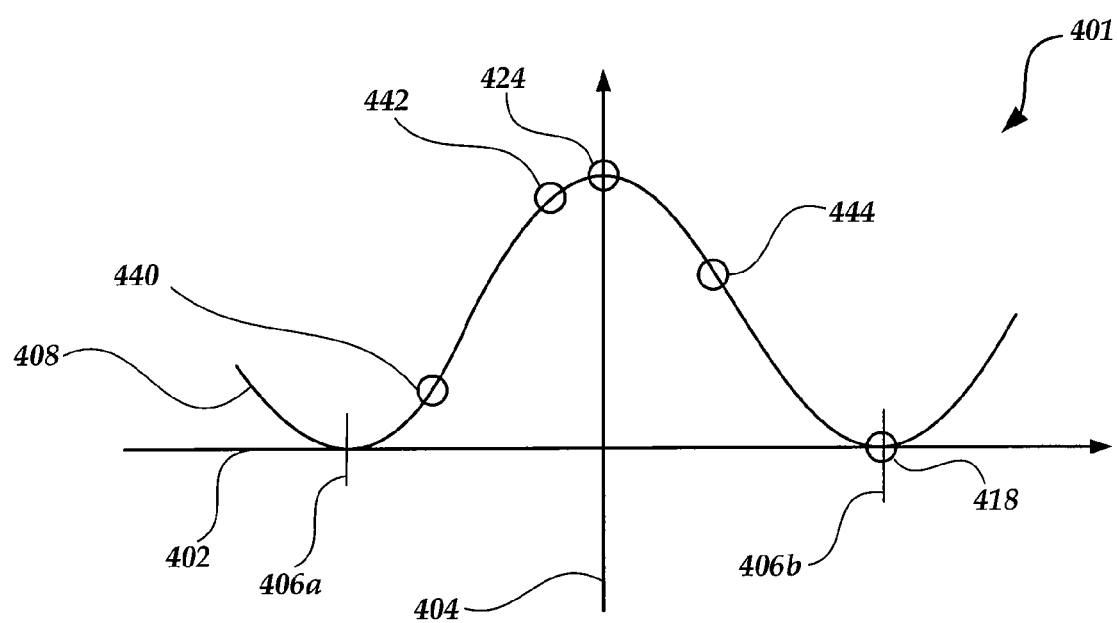

FIG. 4B illustrates a graph 401 that represents an example of light intensity detected by an image sensor as a function of polarity of a polarizer. Like numbered components in FIG. 4B represent like numbered components of FIG. 4A, and the discussion of these components with reference to FIG. 4A applies to FIG. 4B, unless indicated otherwise herein.

In FIG. 4B, horizontal axis 402 is positioned with respect to the graph so that the point of minimal intensity falls on the horizontal axis 402. Vertical axis 404 is positioned so that the point of maximum intensity falls on the vertical axis 404, and this point is referred to herein as having a polarity alignment of zero degrees with respect to the polarized light. Lines 406a and 406b represent polarities of −90 deg and +90 deg, respectively. The vertical axis represents an amount of light intensity received by the image sensor, such that the curve 408 represents the amount of light intensity as a function of the polarizer polarity. It is to be noted that, the horizontal axis of FIG. 4B is placed with knowledge of the minimum point 418, and that prior to performing the process described herein, this point and the location of the horizontal axis is not known. It is to be noted that various embodiments of a polarizer may vary in the amount of polarized light that is blocked, so that even at an optimal polarity setting, some amount of polarized light may reach the sensor. Additionally, measurements of light intensity include unpolarized light. Though the graph of FIG. 4B is normalized to show the minimum point 418 on the horizontal axis 402, this does not necessarily indicate that the true light intensity is zero, or that the amount of polarized light has been reduced to zero.

In one implementation of the fast search in one environment, the system may determine an amount of light intensity at three different polarities, such as represented by points 440, 442, and 444. It is to be noted that these points may be plotted without regard to the positions of the horizontal axis and vertical axis, in that the axes or the graph are not known prior to taking measurements. Therefore, the process may select an arbitrary polarity setting for the first point, a polarity setting at a different value, such as 55° greater than the first setting, for the second point, and a third polarity setting at yet another value, such as 55° greater than the second position. After taking intensity measurements at each setting, the relative positions of the three points 440, 442, and 444 with respect to each other are known. The process may then perform a curve fitting calculation, based on the formula $I_0 \cos^2(\theta)$ to fit the three points 440, 442, and 444 to a curve corresponding to the formula. From the resulting curve, a minimum point 418 may be determined such that it falls at an absolute minimum light intensity value. Though it is not necessary to determine the horizontal axis 402 and vertical axis 404, the horizontal axis could be determined such that the minimum point 418 lies on it. The vertical axis 404 may be placed such that the minimum point 418 has an angle value of 90°. Horizontal axis 402 and vertical axis 404 are illustrated at the resultant positions based on these determinations. The polarizer may then be adjusted to a polarity setting of 90°.

Adjusting the polarity setting may be performed by determining a difference between a known polarity setting relative to the determined curve and the desired polarity setting corresponding to minimum point 418. For example, in the illustrated graph 401, with minimum point 418 at a horizontal value of 90°, point 444 has an approximate horizontal value of 37°. This may be the current polarity after determining the measurement corresponding to this point. Therefore, the polarizer may be rotated clockwise by 53°, representing the difference between point 444 and minimum point 418. Any other known polarity setting may be used to determine a rotation in order to achieve the desired polarity setting.

It is to be noted that the polarity settings discussed above are relative to a vertical axis 404, which is itself relative to a minimum point 418, as determined based on measurements determined during a very small interval of time in a particular position. In a different position, or at a different interval of time, the environment may differ, resulting in a different alignment of the polarizer. Thus, a setting of 90° may correspond to a polarizer polarity different from a subsequent setting of 90°. For example, light sources may differ in the subsequent setting, resulting in differing alignments.

In one implementation, the determined minimum point is considered a point at a tentative optimal polarity setting, and one or more additional measurements may be taken at polarity settings close to the point at the tentative optimal setting, to determine whether to modify the determined point to a more accurate polarity setting. The tentative optimal polarity setting may be determined as a range of settings, and the additional measurements taken within the range.

As discussed above, the first polarity setting may be an arbitrary setting, and the additional polarity settings may be based on the first point. The first, second, and third point as used herein convey different points, and do not necessarily describe the temporal order of the points as used in the process. The selected points may be based on other factors, such as the initial polarity of the polarizer, a polarity from a previous process, or another factor. In one embodiment, in which a series of images are being recorded, such as in a movie, a polarity setting may be selected based on the most recent setting, additional polarity settings may be selected at a position closer to the first setting based on an assumption that the optimal polarity setting is close to the previous optimal polarity setting.

It is to be noted that in differing environments, a graph corresponding to graph 401 may differ in the magnitude of maximum light intensity.

Figure 5:
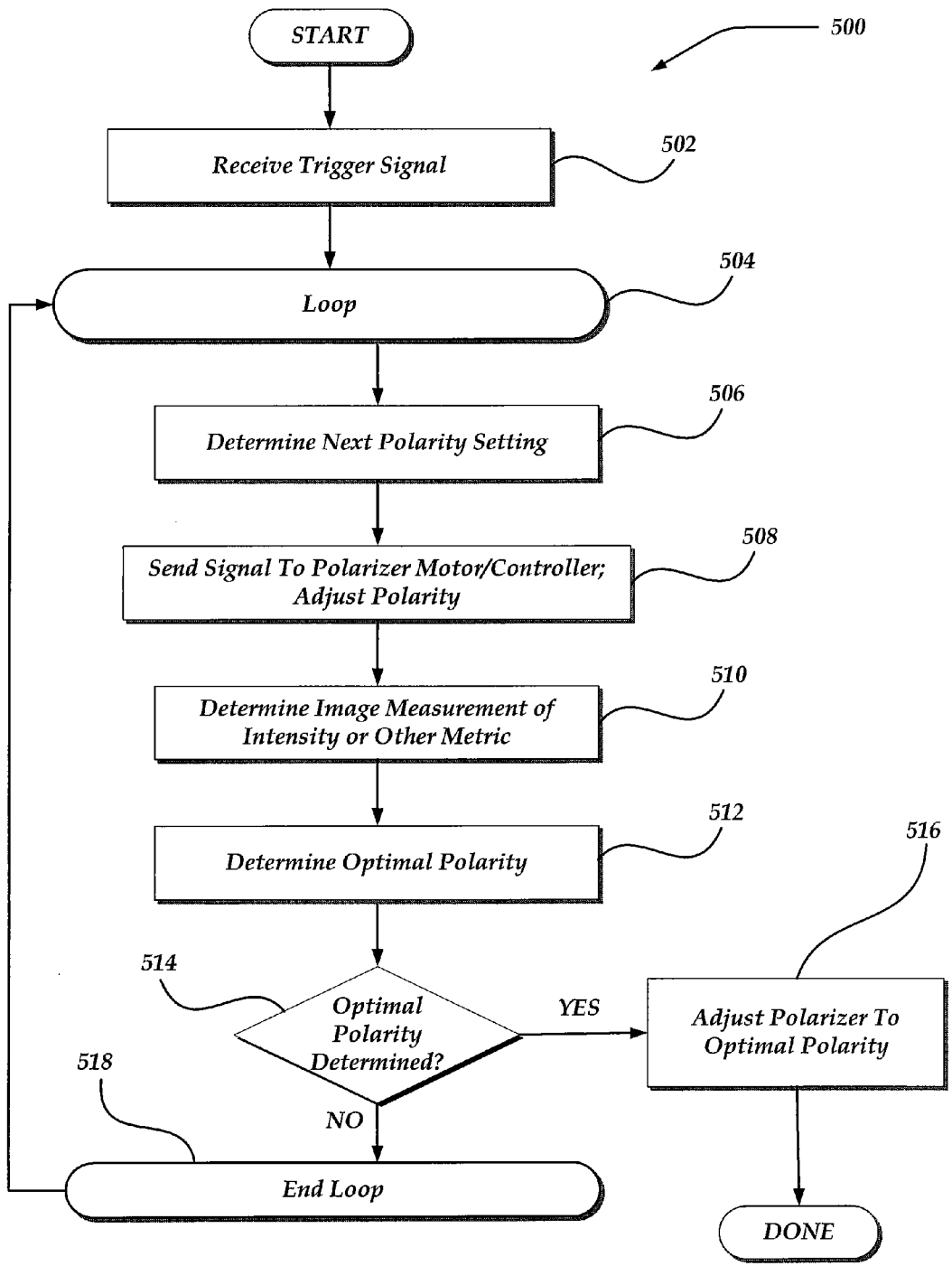
FIG. 5 is a flow diagram illustrating a process of adjusting a polarizer, in accordance with an embodiment of the present invention.

FIG. 5 is a flow diagram illustrating a process 500 of adjusting a polarizer to an optimal polarity setting, in accordance with an embodiment of the present invention. As used herein, the term "optimal setting" or "optimal polarity" refers to a polarity or setting that is sufficiently close to an exact optimal polarity within one or more constraints of the system, configuration, or environment. For example, the mechanisms may be limited by the granularity of polarity adjustments that may be made. Other constraints are the accuracy of a sensor, an amount of time that is acceptable for a determination, a configured number of measurements that may be obtained, or the like. In some implementations, a number of iterations may be used to determine an optimal setting sufficiently close to an exact optimal polarity. Thus, the term "optimal polarity" should be construed to mean a polarity that is sufficiently close to an exact optimal polarity.

As illustrated in FIG. 5, the process 500 begins, after a begin block, at block 502, where a trigger signal is received as an indication to begin the actions of process 500 herein described. In one implementation, a trigger signal may be received in response to a manual action by a user, such as depressing or releasing a button, either completely or partially, a verbal command, a manually set time, or another user action. In one implementation, a trigger signal may be received by an automatic system action, such as a change of system mode, expiration of a time interval, a determination that a received light intensity has changed significantly or increased above a threshold, or the like. In one embodiment, in which the system is employed with a video camera, a trigger signal may be activated based on a time period, a number of frames, or another metric.

In response to receiving a trigger signal, the process may flow to block 504, where a loop begins, iterating a series of actions one or more times. The loop is referred to herein as loop 504. In one implementation, each iteration corresponds to a respective polarity setting.

The process may flow to block 506, where a next polarity setting is determined. In the first iteration, the polarity setting is the first setting. A determination of a first setting may be performed in a variety of ways. In one implementation, the first polarity is the current polarity of the polarizer, and actions of blocks 506 and 508 may effectively be skipped in the first iteration. In one implementation, a first polarity may be a configured setting, a setting based on a previously determined optimal polarity setting, a setting based on an alignment of the camera system, or it may be determined in another manner.

The process may flow to block 508, where the polarizer may be adjusted to the setting determined at block 506. In one implementation, this action may include sending a signal to a polarizer motor that commands the motor to adjust the polarizer to achieve the determined setting. In one implementation, a polarizer motor may adjust the polarizer by rotating it around a point, such as point of rotation 205 of FIG. 2, until the desired polarity is achieved. A signal to the motor may indicate a number of degrees and a direction to rotate the polarizer, or it may indicate an absolute orientation of the polarizer.

In one implementation, a polarizer may be adjusted electronically to obtain a desired polarity. For example, an LCD polarizer may be adjusted by sending an electronic signal indicating a desired polarity, or a desired change in polarity.

The process may flow to block 510, where a measurement of a current image or received light is obtained. As discussed herein, a measurement may be a measurement of average light intensity, contrast, saturation, or another characteristic related to the received light. Various techniques of obtaining one or more measurements are discussed in more detail herein.

The process may flow to block 512, where an optimal polarity setting may be determined, and decision block 514, where a determination is made of whether an optimal polarity setting has been found. These two actions are closely related, and are now discussed together. In some implementations, it may be known that during a specific iteration of loop 504, an optimal polarity setting may be determined. For example, in one implementation a fixed number of iterations are performed. Thus, during iterations prior to the last one, actions of block 512 may be skipped, and block 512 may be performed during the last iteration. Block 512 may be performed as a result of the determination at block 514, that the current iteration is the last iteration. Similarly, in an implementation in which the process is constrained by time, block 514 may determine that the current iteration is the last, and that the actions of block 512 are to be performed. It is to be noted that in implementations such as these in which the actions of block 512 are said to be performed only in the last iteration, partial actions of block 512 may be performed during each iteration.

In some implementations, block 512 may include determining a tentative, optimal polarity setting, and block 514 may include determining whether the candidate setting is sufficient. For example, iterations of loop 504 and block 512 may determine that multiple tentative polarity settings have light intensity measurements sufficiently close to each other such that one of them may be selected as the optimal polarity setting. As another example, during an iteration, it may be determined that a polarity setting corresponding to a previous iteration is to be used as the optimal polarity setting, or that enough measurements have been made to determine the optimal polarity setting. Referring back to graph 400 of FIG. 4A, after determining a light intensity measurement at point 422, the process may determine that the optimal polarity setting falls between points 416 and 420. Thus, decision block 514 may determine that the process has enough data to determine the optimal polarity setting, and, as a result, block 512 may determine the optimal setting. It is to be noted that the optimal polarity setting may be a setting corresponding to an iteration other than the last iteration, or it may be a setting that does not correspond to any iteration and for which an intensity measurement has not been made.

If, at block 514, it is determined that an optimal polarity setting has been determined (or is about to be determined by block 512 as discussed above), the process may flow to block 516, where the polarizer is adjusted to the determined polarity setting. The actions of block 516 may be similar to the actions of block 508, including the various mechanisms for adjusting the polarity setting such as sending a signal to a polarizer motor or controller. In an implementation and environment in which the optimal polarity setting is determined to be the current polarity setting, block 516 may be skipped. Process 500 may then flow to a done block, and return to a calling program or trigger additional actions, such as processing an image capture.

If, at decision block 512, it is determined that an optimal polarity setting has not been determined, the process may flow to block 518, which terminates each iteration of loop 504. The process may then loop back to block 504 to iterate over the loop.

Figure 6:
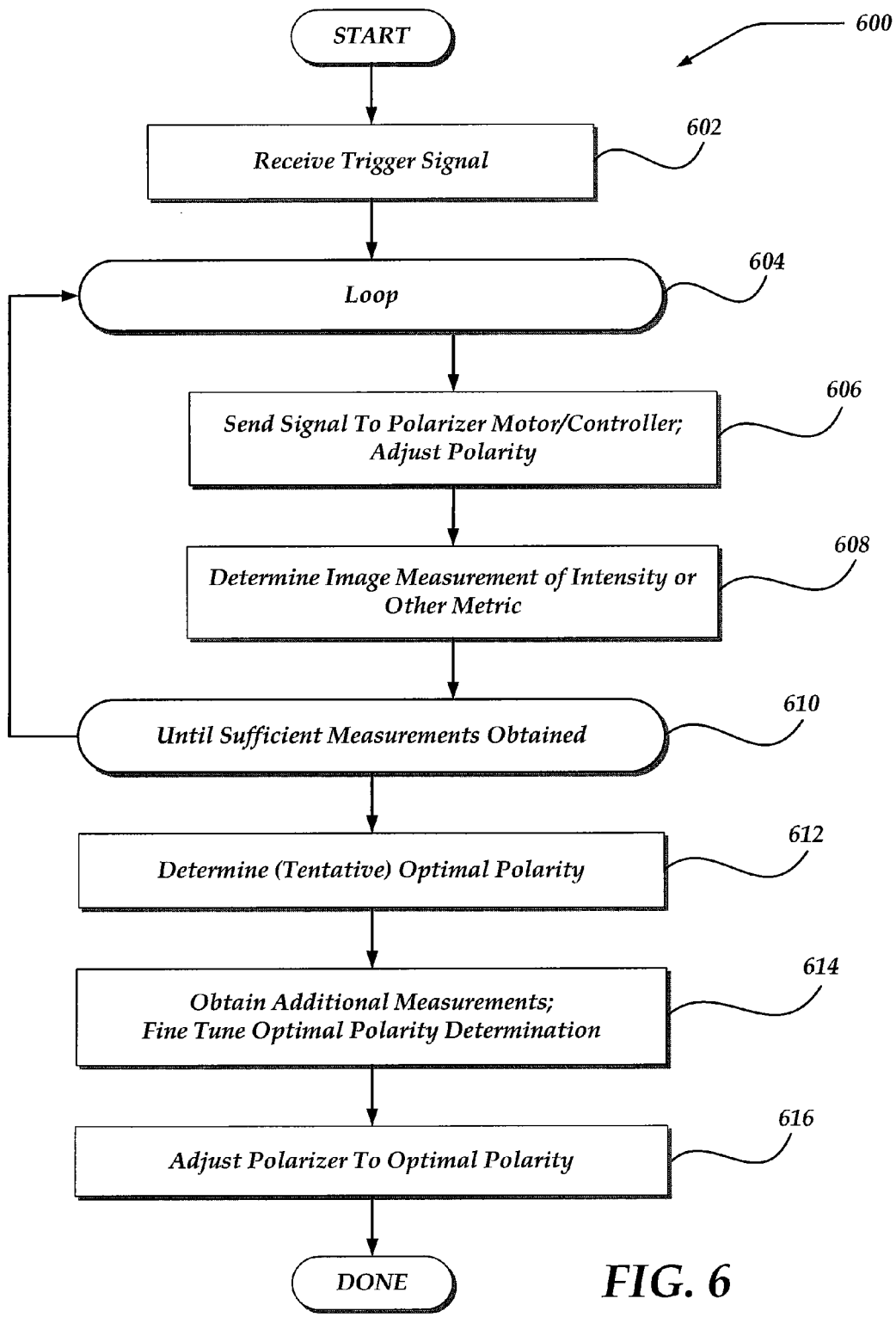
FIG. 6 is a flow diagram illustrating another process of adjusting a polarizer, in accordance with an embodiment of the present invention.

FIG. 6 is a flow diagram illustrating a process 600 of adjusting a polarizer to an optimal polarity setting, in accordance with an embodiment of the present invention. Process 600 employs a fast search mechanism, as discussed elsewhere herein. Process 600 performs some actions that are similar to the actions of process 500, and discussion of those actions with respect to process 500 may be applicable to process 600, unless clearly indicated otherwise.

As illustrated in FIG. 6, the process 600 begins, after a begin block, at block 602, where a trigger signal is received as an indication to begin the actions of process 600 herein described. The discussion of trigger signals at block 502 of FIG. 5 is applicable to block 602.

In response to receiving a trigger signal, the process may flow to block 604, where a loop begins, iterating a series of actions one or more times. The loop is referred to herein as loop 604. In one implementation, each iteration corresponds to a respective polarity setting.

The process may flow to block 606, where the polarizer may be adjusted to a first or next polarity setting. In one implementation, the first polarity is the current polarity of the polarizer, and actions of block 606 may effectively be skipped. In one implementation, a first polarity may be a configured setting, a setting based on an alignment of the camera system, or it may be determined in another manner. The discussion of adjusting polarity settings with respect to process 500 is applicable to the actions of block 606 and process 600.

The process may flow to block 608, where a measurement of a current image or received light is determined. As discussed herein, a measurement may be a measurement of average light intensity, contrast, saturation, or another characteristic related to the received light. Various techniques of obtaining one or more measurements are discussed in more detail herein.

The process may flow to block 610, which terminates each iteration of loop 604. If sufficient measurements have been obtained, the process may exit loop 604. If additional measurements are desired, the process may then loop back to block 604 to iterate over the loop. In one embodiment, loop 604 has a number of iterations corresponding to a predetermined number of polarity settings. In one implementation, the predetermined number is three. In one embodiment, the number of iterations may be determined dynamically, based on measurements obtained within loop 604, a time constraint, a configured level of accuracy, or one or more other factors. For example, in one implementation, three measurements may initially be obtained. If the measurements do not vary significantly, this may indicate that the amount of polarized light is small, and a small difference from exact optimal polarity is acceptable. If the measurements differ significantly, one or more additional iterations of loop 604 may be performed to achieve higher accuracy.

The process may flow to block 612, where an optimal polarity setting or a tentative optimal polarity setting may be determined. As discussed herein, in one embodiment, the optimal polarity setting may be determined based on a square of the cosine of the angle between a polarizer polarity axis setting and the initial plane of the polarized light. Various trigonometric, polynomial, or other functions may be used as an equivalent or approximate function of the cosine function. As used herein, the term "trigonometric function" includes equivalent or approximately equivalent functions.

In an implementation or configuration in which the optimal polarity setting is determined, the process may skip the actions of block 614 and flow to block 616, where the polarizer is adjusted to the determined polarity setting. The actions of block 616 may be similar to the actions of block 606, including sending a signal to a polarizer motor or controller, or other mechanisms for adjusting the polarity setting. In an implementation and environment in which the optimal polarity setting is determined to be the current polarity setting, block 616 may be skipped. Process 600 may then flow to a done block, and return to a calling program or trigger additional actions, such as processing an image capture.

As discussed herein, in some implementations or configurations, the actions of block 612 may determine a tentative optimal polarity setting, and the process may flow to block 614. At block 614, actions may include obtaining one or more additional measurements at corresponding additional polarity settings approximate to the tentative optimal polarity setting. This may allow fine tuning of the tentative optimal polarity setting to a greater level of accuracy. Though not illustrated in FIG. 6, actions of block 614 may be selectively performed based on an implementation or configuration, or on the measurements previously obtained within process 600. The dynamic factors for determining whether to perform the actions of block 614 may be similar to those described for exiting loop 604 at block 610, such as a time constraint or a magnitude of difference between prior measurements. In one embodiment, some of the actions of process 500 may be combined with at least some of the actions of process 600 to determine an optimal polarity setting and adjust a polarizer accordingly.

Process 600 may flow to block 616, where the polarizer is adjusted to the determined polarity setting. In an implementation and environment in which the optimal polarity setting is determined to be the current polarity setting, block 616 may be skipped. Process 600 may then flow to a done block, and return to a calling program or trigger additional actions, such as processing an image capture.

In one embodiment, the measurements obtained as described herein are performed within rapid succession, to minimize any changes of intensity due to changes in the environmental light. In some environments, the light of a flash may be reflected or bounced from an object, causing light polarization. In one embodiment, a flash may be triggered in conjunction with each measurement, in order to receive measurements with similar lighting.

In one embodiment, a process for determining an optimal polarity setting may include timing the measurements to adapt to a fluorescent light or a combination of fluorescent light with non-alternating light in an environment. The sensor readings of process 500 or 600 may be obtained in intervals so that they occur on the same phase of the fluorescent light strobe. For example, if the environment includes a 60 Hz fluorescent light, the measurements may be obtained in time intervals T, so that T is an integer multiple of $\frac{1}{60}$ of a second. If the environment includes a 50 Hz fluorescent light, the time intervals T may be an integer multiple of $\frac{1}{50}$ of a second. In one embodiment, the mechanisms described herein may include or employ a light sensor with a phase lock loop (PLL), in order to synchronize the measurements to the frequency and phase of a fluorescent light. A PLL may be implemented in a number of ways, and generally includes a phase detector that may be used to detect the phase of a fluorescent light. Each of the measurements may thus be taken at the same phase of the fluorescent light. This technique may also be employed for other types of alternating light sources.

It will be understood that each block of the flowchart illustrations of FIGS. 5 and 6 and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for filtering polarized light comprising:
   a) a light measurement component for determining a characteristic of a light received by a sensor after the received light is processed by a polarizer;
   b) a logic unit in communication with the light measurement component, comprising logic to perform actions including:
      i) automatically adjusting the polarizer to a plurality of polarity settings;
      ii) employing the light measurement component and sensor to determine at least three measurements of the light characteristic, each of the at least three measurements corresponding to a respective polarity setting of the plurality of polarity settings;
      iii) automatically determining, based on the at least three light measurements, an optimal polarity setting; and
      iv) automatically adjusting the polarizer to at least approximately the determined optimal polarity setting.

2. The system of claim 1, the actions further comprising employing a curve fitting calculation based on the at least three light measurements.

3. The system of claim 1, wherein the light characteristic is light intensity, contrast, or saturation.

4. The system of claim 1, the actions further comprising employing a curve fitting calculation based on the at least three light measurements, automatically adjusting the polarizer to at least one additional polarity setting based on the curve fitting calculation, determining at least one additional light measurement corresponding to the at least one additional polarity setting, and determining the optimal setting based on the at least one additional light measurement and the at least one additional polarity setting.

5. The system of claim 1, the actions further including in response to receiving a signal from a manual switch, performing the actions of automatically adjusting the polarizer and determining the at least three light measurements.

6. The system of claim 1, the actions further comprising automatically determining a plurality of optimal polarity settings and automatically adjusting the polarizer to each of the plurality of optimal polarity settings during a sequence of image captures.

7. The system of claim 1, wherein the light measurement includes a value representative of an average light intensity.

8. The system of claim 1, further comprising the polarizer and the sensor.

9. The system of claim 1, wherein determining the at least three light measurements comprises performing the at least three measurements at one or more time intervals based on a frequency of a light strobe.

10. The system of claim 1, wherein determining the at least three light measurements comprises performing the at least three measurements at a common phase of a light source.

11. A system for filtering polarized light comprising:
    a) a mechanism for automatically adjusting a polarizer to each of a plurality of polarity settings;
    b) measurement means for automatically determining a plurality of measurements of a light characteristic, each measurement corresponding to a respective one of the plurality of polarity settings, said means including a light measurement component for determining the measurement of the characteristic of a light received by a sensor after the received light is processed by the polarizer; and
    c) means for adjusting the polarizer to an optimal polarity setting based on the plurality of light measurements.

12. The system of claim 11, the means for adjusting the polarizer comprising logic that determines the optimal polarity setting by fitting the plurality of light measurements to a trigonometric function.

13. The system of claim 11, the means for adjusting the polarizer comprising logic that determines the optimal polarity setting by fitting the plurality of light measurements to a trigonometric function, determining a tentative optimal polarity setting and obtaining additional light measurements approximate to the tentative optimal polarity setting.

14. The system of claim 11, the measurement means comprising a timing mechanism for employing an interval based on a phase of a light source.

15. The system of claim 11, the measurement means comprising a mechanism for determining a light intensity value.

16. A method for filtering polarized light comprising:
   a) receiving light from an external source, the light comprising polarized light and unpolarized light;
   b) automatically adjusting a polarizer to a plurality of polarity settings;
   c) employing a sensor to determine at least three values of a characteristic of the light, each of the at least three values corresponding to at a respective polarity setting of the at least three polarity settings, including each of the plurality of polarity settings, the characteristic having a dependency on an amount of the polarized light;
   d) automatically determining, based on the characteristic values corresponding to each of the at least three polarity settings, an optimal polarity setting; and
   e) automatically adjusting the polarizer to a polarity setting at least approximate to the determined optimal polarity setting.

17. The method of claim 16, automatically determining comprising employing a curve fitting calculation based on a trigonometric formula and the at least three characteristic values.

18. The method of claim 16, wherein the characteristic is a characteristic selected from the group consisting of intensity, contrast, and saturation.

19. A method for filtering polarized light comprising in response to a manual selection of a switch in preparation for capturing a photograph, performing the method of claim 16.

20. The method of claim 16, automatically determining comprising:
   a) employing a curve fitting calculation based on a trigonometric formula and the at least three characteristic values to determine a tentative optimal setting;
   b) automatically adjusting the polarizer polarity setting to at least one additional polarity setting approximate to the tentative optimal setting;
   c) determining at least one additional value of the characteristic corresponding to the at least one additional polarity setting;
   c) determining the optimal setting based on the at least one additional value of the characteristic and the at least one additional polarity setting.

* * * * *

UNITED STATES PATENT AND TRADEMARK OFFICE
CERTIFICATE OF CORRECTION

| | | |
|---|---|---|
| PATENT NO. | : 8,059,275 B1 | Page 1 of 1 |
| APPLICATION NO. | : 12/352520 | |
| DATED | : November 15, 2011 | |
| INVENTOR(S) | : Eran David Pinhasov | |

It is certified that error appears in the above-identified patent and that said Letters Patent is hereby corrected as shown below:

In column 18, line 21, in Claim 20, delete "c)" and insert -- d) --, therefor.

Signed and Sealed this
Tenth Day of April, 2012

David J. Kappos
*Director of the United States Patent and Trademark Office*